US011951927B1

(12) United States Patent
Faruque et al.

(10) Patent No.: US 11,951,927 B1
(45) Date of Patent: Apr. 9, 2024

(54) SEATBACK SUPPORTED AIRBAG AND SEATBELT WEBBING

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/150,503

(22) Filed: Jan. 5, 2023

(51) Int. Cl.
*B60R 21/18* (2006.01)
*B60R 21/207* (2006.01)
*B60R 21/233* (2006.01)
*B60R 21/02* (2006.01)
*B60R 21/231* (2011.01)
*B60R 21/264* (2006.01)

(52) U.S. Cl.
CPC .......... *B60R 21/18* (2013.01); *B60R 21/207* (2013.01); *B60R 21/233* (2013.01); *B60R 2021/022* (2013.01); *B60R 2021/0273* (2013.01); *B60R 2021/23161* (2013.01); *B60R 21/2644* (2013.01)

(58) Field of Classification Search
CPC ...... B60R 2021/0273; B60R 2021/022; B60R 21/18
See application file for complete search history.

(56) References Cited

U.S. PATENT DOCUMENTS

| 9,132,798 | B2 | 9/2015 | Yasuoka |
| 9,573,553 | B2 | 2/2017 | Ko et al. |
| 10,112,570 | B2 | 10/2018 | Barbat et al. |
| 10,625,704 | B2* | 4/2020 | Dry .................. B60R 21/207 |
| 10,682,578 | B1* | 6/2020 | Malatek ................ A61B 5/024 |
| 10,926,733 | B2* | 2/2021 | Dry .................. B60R 21/23138 |
| 10,946,826 | B2 | 3/2021 | Jaradi et al. |
| 11,040,691 | B2 | 6/2021 | Faruque et al. |
| 11,084,447 | B2 | 8/2021 | Rupp et al. |
| 11,312,325 | B2 | 4/2022 | Farooq et al. |
| 11,383,667 | B1 | 7/2022 | Kadam et al. |
| 11,618,404 | B1* | 4/2023 | Jaradi ............... B60R 21/23138 280/730.1 |
| 2010/0025972 | A1 | 2/2010 | Nezaki |
| 2020/0114857 | A1* | 4/2020 | Jaradi ................... B60R 21/231 |
| 2020/0164828 | A1 | 5/2020 | Park et al. |
| 2021/0009067 | A1* | 1/2021 | Kadam ................ B60R 21/239 |
| 2021/0009068 | A1 | 1/2021 | Farooq et al. |

FOREIGN PATENT DOCUMENTS

| CN | 112208480 A * | 1/2021 | ............. B60R 21/02 |
| DE | 19859988 A1 | 6/2000 | |
| DE | 102017131121 A1 | 6/2019 | |
| DE | 102022109168 A1 * | 10/2022 | ........... B60R 21/207 |
| JP | 2008081002 A | 4/2008 | |

* cited by examiner

*Primary Examiner* — Nicole T Verley
(74) *Attorney, Agent, or Firm* — Frank A. MacKenzie; Bejin Bieneman PLC

(57) ABSTRACT

An assembly includes a vehicle seat having a seat bottom and a seatback supported by the seat bottom. The assembly includes an airbag supported by the seatback. The airbag is inflatable to an inflated position. The assembly includes a seatbelt webbing extending from the seatback to the airbag. The seatbelt webbing is between the airbag and the seatback in the inflated position. The assembly includes a pyrotechnic device supported by the seat bottom and operatively coupled to the airbag.

20 Claims, 6 Drawing Sheets

SEATBACK SUPPORTED AIRBAG AND SEATBELT WEBBING

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
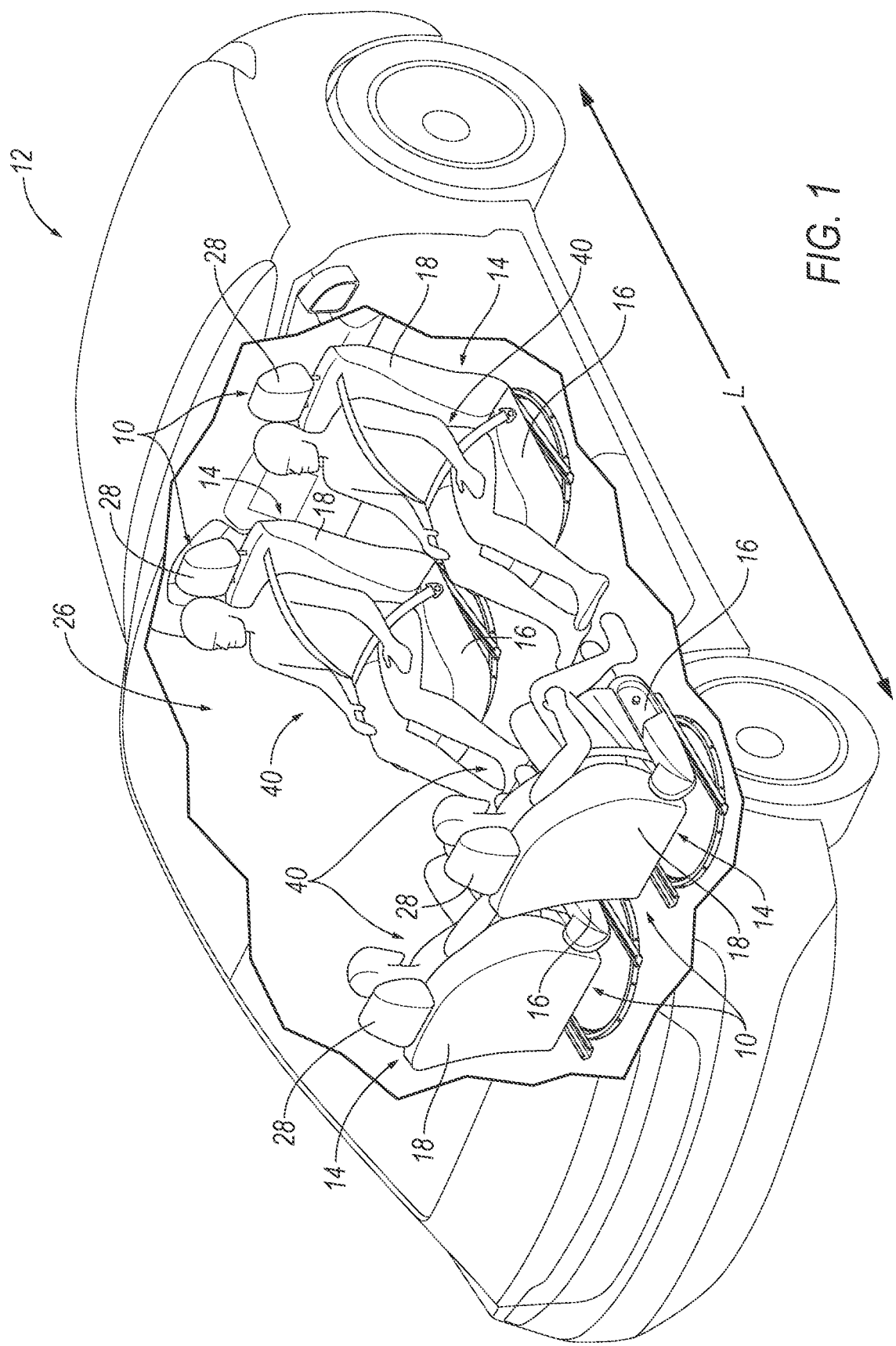
FIG. 1 is a perspective view of a vehicle having a plurality of seats.

An assembly includes a vehicle seat having a seat bottom and a seatback supported by the seat bottom. The assembly includes an airbag supported by the seatback. The airbag is inflatable to an inflated position. The assembly includes a seatbelt webbing extending from the seatback to the airbag. The seatbelt webbing is between the airbag and the seatback in the inflated position. The assembly includes a pyrotechnic device supported by the seat bottom and operatively coupled to the airbag.

The airbag may include a main chamber, a first tubular chamber, and a second tubular chamber. The main chamber may be between the first tubular chamber and the second tubular chamber.

The seatback may define a first bolster and a second bolster spaced cross-seat from the first bolster. The first tubular chamber may extend along the first bolster in the inflated position and the second tubular chamber may extend along the second bolster.

The assembly may include an inflator supported by the seatback, the inflator being in fluid communication with the main chamber, the first tubular chamber, and the second tubular chamber.

The vehicle seat may define an occupant seating area, the occupant seating area being between the first tubular chamber and the second tubular chamber when the airbag is in the inflated position.

The seatback may define a first bolster and a second bolster spaced cross-seat from the first bolster, the airbag extends from the first bolster to the second bolster in the inflated position.

The seatbelt webbing may include a lap portion elongated in a cross-seat direction and a pair of shoulder portions extending from the seatback to the lap portion. The shoulder portions may be spaced cross-seat from each other.

The vehicle seat may include a head restraint supported by and extending upwardly from the seatback. The head restraint may be between the shoulder portions.

The airbag may include a first tubular chamber and a second tubular chamber spaced cross-seat from the first tubular portion and the lap portion may extend from the first tubular chamber to the second tubular chamber.

When the airbag is in the inflated position, the lap portion may be designed to extend across a lap of an occupant of the vehicle seat and the shoulder portions may be designed to extend across shoulders of the occupant.

The assembly may include a tether extending from the pyrotechnic device to the airbag. The tether may be retractable by the pyrotechnic device.

The assembly may include a second pyrotechnic device supported by the seat bottom and spaced cross-seat from the pyrotechnic device.

The assembly may include a first tether extending from the pyrotechnic device to the airbag and a second tether extending from the second pyrotechnic device to the airbag. The first tether and the second tether may be retractable by the pyrotechnic devices.

The vehicle seat may define an occupant seating area, the occupant seating area being between the airbag and the seatback when the airbag is in the inflated position.

The occupant seating area may be between the seatbelt webbing and the seatback when the airbag is in the inflated position.

The seatbelt webbing may be between the airbag and the occupant seating area when the airbag is in the inflated position.

The assembly may include a retractor supported by the seatback. The retractor may be retractably coupled to the seatbelt webbing.

The pyrotechnic device may be designed to pull the seatbelt webbing across an occupant of the vehicle seat when the airbag is in the inflated position.

The seatbelt webbing may extend from an upper end of the seatback to a bottom end of the airbag when the airbag is in the inflated position.

The seatbelt webbing may be unattached to the airbag between the upper end of the seatback and the bottom end the airbag.

With reference to the Figures, wherein like numerals indicate like parts throughout the several views, an assembly 10 for a vehicle 12 includes a vehicle seat 14 having a seat bottom 16 and a seatback 18 supported by the seat bottom 16. The assembly 10 includes an airbag 20 supported by the seatback 18. The airbag 20 is inflatable to an inflated position. The assembly 10 includes a seatbelt webbing 22 extending from the seatback 18 to the airbag 20. The seatbelt webbing 22 is between the airbag 20 and the seatback 18 in the inflated position. The assembly 10 includes a pyrotechnic device 24 supported by the seat bottom 16 and operatively coupled to the airbag 20.

In the event of certain vehicle impacts, the airbag 20 inflates to the inflated position to control the kinematics of an occupant seated in the seat 14. As the airbag 20 inflates, the airbag 20 first inflates upwardly to clear the seat 14 and an occupant of the seat 14. After the airbag 20 inflates upwardly, the pyrotechnic device 24 activates to pull the airbag 20 and the seatbelt webbing 22 over an occupant seated in the seat 14. Specifically, the pyrotechnic device 24 pulls the seatbelt webbing 22 and airbag 20 downwardly toward the seat bottom 16 to surround the occupant of the seat 14 to the tighten the seatbelt webbing 22 around the occupant of the seat 14.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle floor (not numbered), vehicle roof (not numbered), etc. The vehicle 12 includes a passenger compartment 26 (not numbered) to house occupants, if any, of the vehicle 12. The passenger compartment 26 may extend across the vehicle 12, i.e., from one side to the other side of the vehicle 12. The passenger compartment 26 includes a front end and a rear end with the front end being in front of the rear end during forward movement of the vehicle 12.

The vehicle 12 may include one or more seats 14. Specifically, the vehicle 12 may include any suitable number of seats 14. The seats 14 are supported by the vehicle floor (not numbered). The seats 14 may be arranged in any suitable arrangement in the passenger compartment 26. One or more of the seats 14 may be at the front end of the passenger compartment 26, e.g., a driver seat and/or a passenger seat. In other examples, one or more of the seats 14 may be behind the front end of the passenger compartment 26, e.g., at the rear end of the passenger compartment 26. The seats 14 may be movable relative to the vehicle floor to various positions, e.g., movable fore-and-aft and/or cross-vehicle. The seat 14 may be of any suitable type, e.g., a bucket seat.

The seats 14 include a seatback 18, a seat bottom 16, and a head restraint 28. The head restraint 28 may be supported by and extends upwardly from the seatback 18. The head restraint 28 may be stationary or movable relative to the seatback 18. The seatback 18 may be supported by the seat bottom 16 and may be stationary or movable relative to the seat bottom 16. The seatback 18 may extend from an upper end 30 to a lower end 32. The lower end 32 may be connected to the seat bottom 16. The upper end 30 of the seatback 18 may be spaced upwardly from the lower end 32 of the seatback 18, i.e., upwardly from the seat bottom 16. The head restraint 28 may extend upwardly from the upper end 30 of the seatback 18. The seatback 18, the seat bottom 16, and the head restraint 28 may be adjustable in multiple degrees of freedom. Specifically, the seatback 18, the seat bottom 16, and the head restraint 28 may themselves be adjustable. In other words, adjustable components within the seatback 18, the seat bottom 16, and the head restraint 28 may be adjustable relative to each other.

Figure 2:
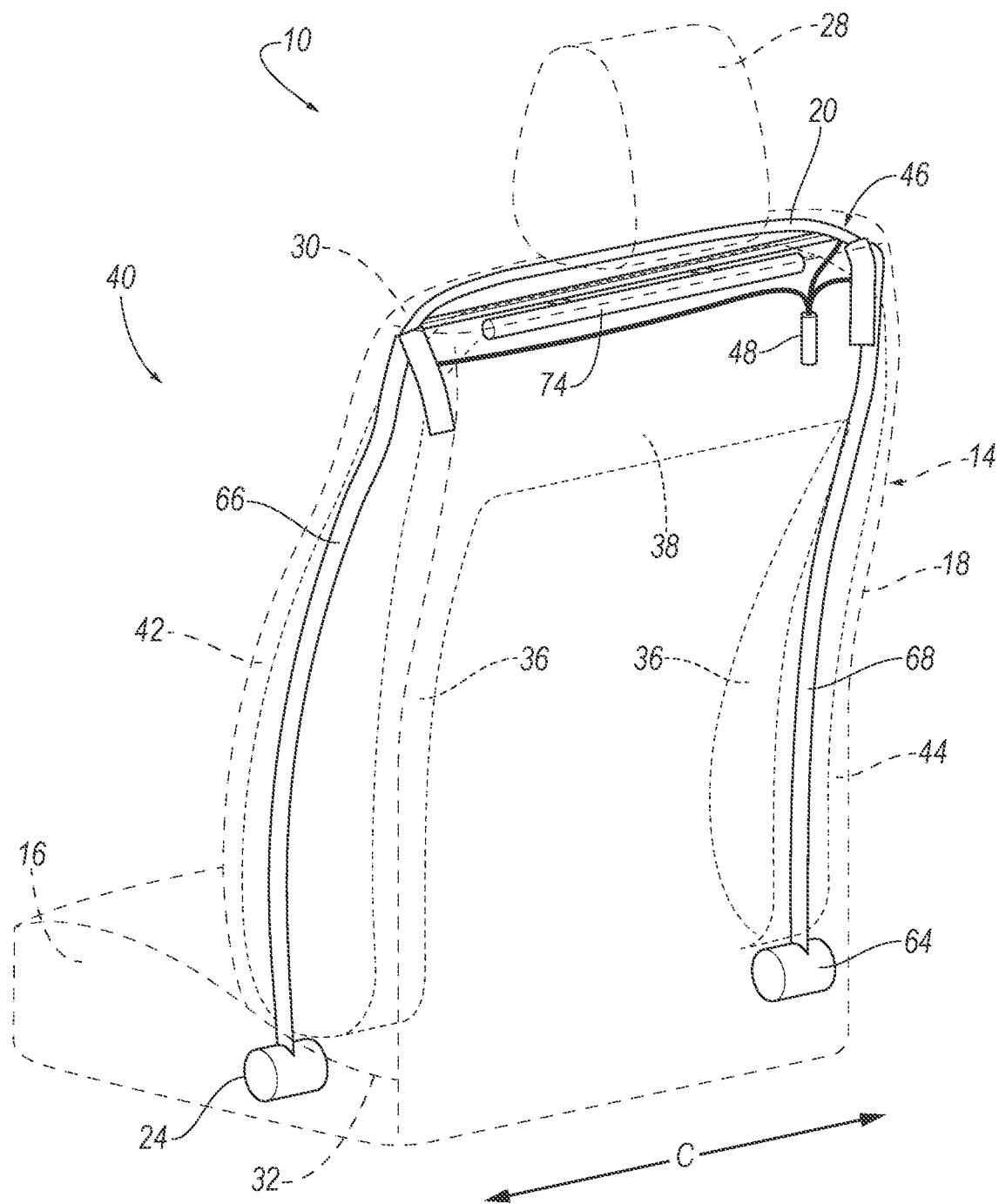
FIG. 2 is a rear perspective view of a seat of the vehicle having an airbag supported by a seatback of the seat.

With reference to FIG. 2, the seatback 18 includes a frame 34 and a covering (not numbered) supported on the frame 34. The frame 34 may include tubes, beams, etc. Specifically, the frame 34 includes a pair of upright frame members 36. The upright frame members 36 are elongated, and specifically, are elongated in a generally upright direction when the seatback 18 is in a generally upright position. The upright frame members 36 are spaced from each other and the frame 34 includes one or move cross-members 38 (not numbered) extending between the upright frame members 36. The frame 34, including the upright frame members 36, may be of any suitable plastic material, e.g., carbon fiber reinforced plastic (CFRP), glass fiber-reinforced semi-finished thermoplastic composite (organosheet), etc. As another example, some or all components of the frame 34 may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the frame 34. The padding may be between the covering and the frame 34 and may be foam or any other suitable material.

Each seat 14 may rotate about an axis (not numbered) that extends through the vehicle roof and the vehicle floor. For example, the seats 14 may rotate between a forward-facing position and a rearward-facing position. In the forward-facing position, an occupant of the seat 14 faces the front end of the passenger compartment 26. In the rearward-facing position, an occupant of the seat 14 faces the rear end of the passenger compartment 26. The seats 14 may rotate completely, i.e., 360°, about the axis. The seats 14 may rotate between fixed positions, e.g., the forward-facing position and the rearward-facing position, or may be rotatable to an infinite number of positions.

The seat bottom 16 and seatback 18 may define a cross-seat midline M. The cross-seat midline M may extend equidistantly from either side of the seat bottom 16 and the seatback 18. When the seat 14 is in the forward-facing position or the rearward-facing position, the cross-seat midline M may extend along a vehicle-longitudinal axis L, i.e., an axis that extends from the front end of the passenger compartment 26 to the rear end of the passenger compartment 26. When the seat 14 is in a position offset from the forward-facing position or the rearward-facing position, the cross-seat midline M may be offset from the forward-facing position or the rearward-facing position.

Figure 3:
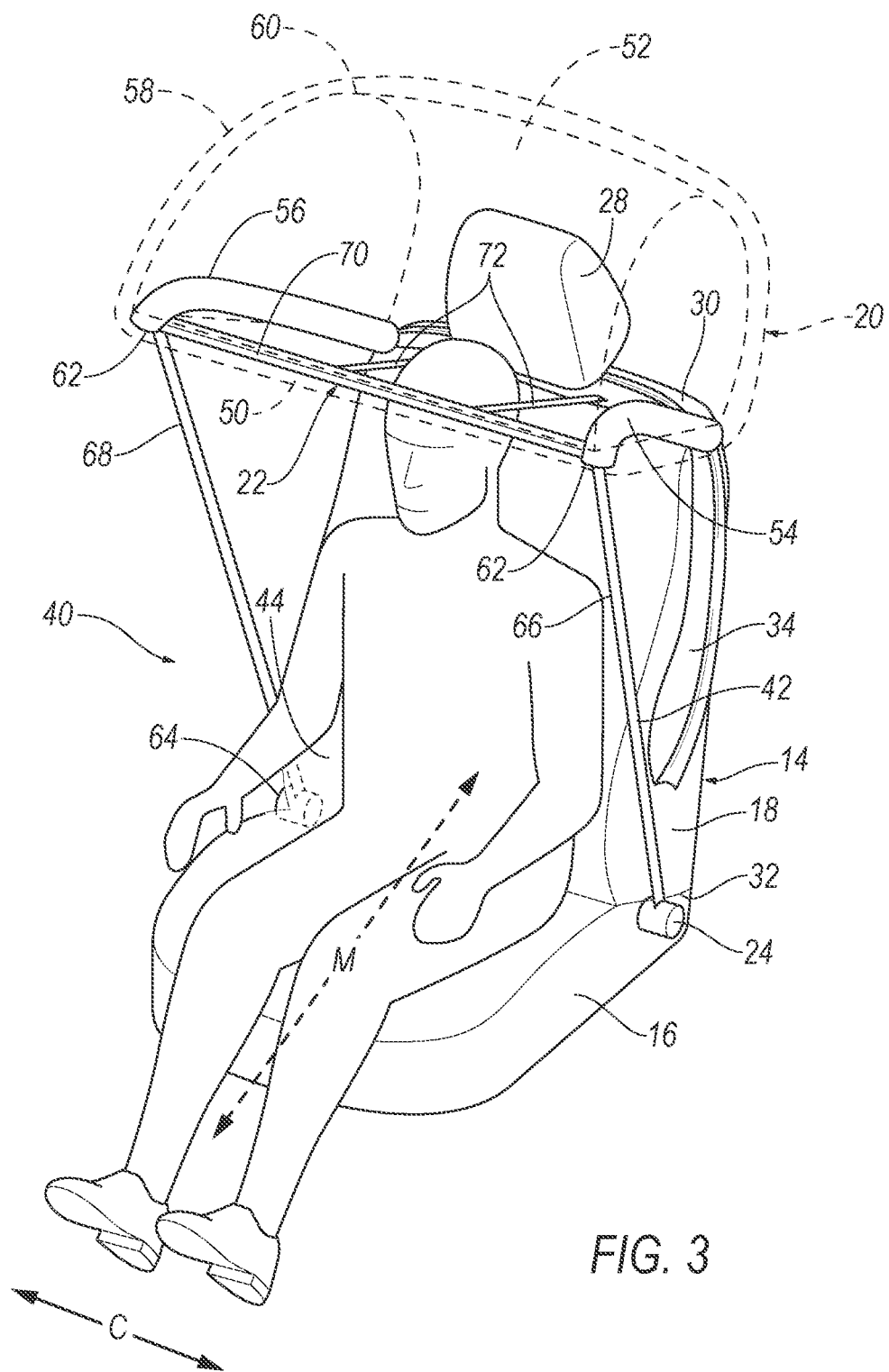
FIG. 3 is a forward perspective view of the seat with the airbag inflating to a partially inflated position and pair of tethers retractable by pyrotechnic devices.

With reference to FIG. 3, the seatback 18 defines an occupant seating area 40 of the seat 14. The occupant seating area 40 is the area occupied by an occupant when properly seated on the seat bottom 16 and the seatback 18. The occupant seating area 40 is in a seat-forward direction of the seatback 18 and above the seat bottom 16. In the example shown in the Figures the occupant seating area 40 faces the front end of the passenger compartment 26 when the seat 14 is in the forward-facing position and the occupant seating area 40 faces the rear end of the passenger compartment 26 when the seat 14 is in the rearward-facing position.

The seatback 18 may have a pair of bolsters 42, 44, e.g., a first bolster 42 and a second bolster 44, each bolster being on opposite sides of the seatback 18. In other words, the bolsters 42, 44 are spaced cross-seat from each other. Specifically, the occupant seating area 40 is between the bolsters 42, 44. The bolsters 42, 44 are elongated, and specifically, are elongated in a generally upright direction when the seatback 18 is in a generally upright position. The bolsters 42, 44 define cross-seat boundaries of the seatback 18, i.e., the seatback 18 terminates at the bolsters 42, 44. The bolsters 42, 44 may extend in a seat-forward direction relative to the occupant seating area 40, i.e., on opposite sides of the torso and shoulders of an occupant seated on the seat 14. The extension of the bolsters 42, 44 relative to the occupant seating area 40 may be defined by the upright frame members 36 and/or the covering. The size and shape of both the upright frame members 36 and the covering form the bolsters 42, 44.

With reference to FIGS. 2-6, the vehicle 12 includes one or more airbag assemblies 46. Specifically, the airbag assemblies 46 may be supported by one or more of the seats 14.

The airbag assembly 46 includes the airbag 20, an inflator 48, and may include a housing (not shown). The vehicle 12 may include any suitable number of airbag assemblies 46. As one example, an airbag assembly 46 may be supported by each of the seats 14 of the vehicle 12. In examples including more than one airbag assembly 46, the airbag assembly 46 may be identical or substantially identical to each other.

The airbag assembly 46, specifically, the airbag 20 is supported by the seat 14. The airbag assembly 46, i.e., the airbag 20, is supported by the frame 34 of the seat 14 at the upper end 30 of the seatback 18. Specifically, the airbag assembly 46 is mounted to the frame 34 of the seatback 18. The airbag 20 is inflatable from the uninflated position to a partially inflated position to the inflated position. The airbag is fully inflated in the inflated position and is partially inflated in the partially inflated position. As shown in FIG. 2, the airbag assembly 46 may extend along the frame 34 of the seat 14 when the airbag 20 is in an uninflated position. Specifically, the airbag 20 may extend along the upright frame members 36 and across the cross-member 38 of the frame 34 of the seat 14. The airbag assembly 46 may be mounted to the frame 34 of the seatback 18 in any suitable way, e.g., fasteners. The airbag assembly 46 may be concealed by the covering, e.g., the upholstery of the seat 14. In other words, the airbag assembly 46 may be between the frame 34 of the seat 14 and the upholstery of the seat 14. The covering may be releasable along the airbag 20, e.g., the covering may include a tear seam along the frame 34 that is releasable as the airbag 20 moves from the uninflated position to the inflated position.

In the inflated position, the airbag 20 extends from the seatback 18 of the seat 14 and away from the seatback 18 of the seat 14. The airbag 20 may extend from the upper end 30 of the seatback 18 to a bottom end 50 spaced from the seatback 18. The bottom end 50 of the airbag 20 may be adjacent the occupant, e.g., the occupant's lap, when the airbag 20 is in the inflated position. The airbag 20 extends from one side of the seatback 18 to the other side of the seatback 18 in the inflated position. Specifically, the airbag 20 extends from the first bolster 42 of the seatback 18 to the second bolster 44 of the seatback 18 in the inflated position. The airbag 20 extends around the occupant seating area 40 from the first bolster 42 to the second bolster 44. Specifically, the airbag 20 may be elongated in a round path from the first bolster 42 to the second bolster 44. The airbag 20 may extend in a rounded path from the first bolster 42 to the second bolster 44 around the occupant seating area 40. The airbag 20 encloses the occupant seating area 40 between the airbags 20 and a seat-forward portion of the seatback 18 in the inflated position. Specifically, the airbag 20 surrounds the occupant seating area 40 when the airbag 20 is in the inflated position. In other words, the occupant seating area 40 is between the airbag 20 and the seatback 18 when the airbag 20 is in the inflated position. The airbag 20 may surround an occupant seated in the occupant seating area 40 when the airbag 20 is in the inflated position. The airbag 20 is between the vehicle roof and the occupant seating area 40, i.e., overhead of the occupant in the occupant seating area 40. Accordingly, the airbag 20 controls the kinematics of the occupant seated in the seat 14 and may separate the occupant of the seat 14 from other vehicle components in the vehicle 12 in the event of certain vehicle impacts.

With continued reference to FIGS. 2-6, the airbag 20 may include a plurality of chambers 52, 54, 56. Specifically, the airbag 20 may include a main chamber 52, a first tubular chamber 54, and a second tubular chamber 56. The main chamber 52 may be elongated from the upper end 30 of the seatback 18 to the bottom end 50 adjacent the legs of the occupant in the inflated position. The main chamber 52 may include an inner panel 58 and an outer panel 60 spaced from the inner panel 58 by an inflation chamber. The inner panel 58 may face toward the occupant seating area 40 when the airbag 20 is in the inflated position. The outer panel 60 may face outwardly toward the passenger compartment 26 when the airbag 20 is in the inflated position. The inner panel 58 may control the kinematics of the occupant in the event of certain vehicle impacts.

As discussed above, the airbag 20 includes the first tubular chamber 54 and the second tubular chamber 56. The first tubular chamber 54 and the second tubular chamber 56 may each extend along the main chamber 52 when the airbag 20 in the partially inflated position and the inflated position. Specifically, the first tubular chamber 54 and the second tubular chamber 56 are elongated along the main chamber 52 when the airbag 20 in the partially inflated position and the inflated position. The first tubular chamber 54 and the second tubular chamber 56 are each of a tubular shape adjacent the main chamber 52. Specifically, the first tubular chamber 54 and the second tubular chamber 56 are long, narrow, hollow tubes elongated along the main chamber 52 that inflate as the airbag 20 moves to the partially inflated position.

As the airbag 20 moves toward the inflated position, the first tubular chamber 54 and the second tubular chamber 56 begin to inflate. As the first tubular chamber 54 and the second tubular chamber 56 begin to inflate, the first tubular chamber 54 and the second tubular chamber 56 may guide the main chamber 52 of the airbag 20 upwardly and away from the upper end 30 of the occupant seating area 40 to surround the head restraint 28 and a head of the occupant. Specifically, as shown in FIG. 3, the first tubular chamber 54 and the second tubular chamber 56 guide the main chamber 52 toward the partially inflated position over the head restraint 28 and head of the occupant. As discussed further below, the pyrotechnic device 24 may pull the airbag 20 downwardly to surround the occupant seating area 40 after the first tubular chamber 54 and the second tubular chamber 56 guided the main chamber 52 upwardly from the occupant seating area 40. When the pyrotechnic device 24 retracts, the airbag 20 surrounds the occupant of the occupant seating area 40.

As the airbag moves toward the inflated position, the first tubular chamber 54 and the second tubular chamber 56 may be spaced cross-seat from each other with the main chamber 52 being between the first tubular chamber 54 and the second tubular chamber 56. Specifically, the first tubular chamber 54 and the second tubular chamber 56 each extend from the seatback 18, along the main chamber 52, to distal ends 62 spaced cross-vehicle from each other. The distal ends 62 of the tubular chambers 54, 56 are positioned at the bottom end 50 of the airbag 20. The first tubular chamber 54 may be elongated along the first bolster 42 and the second tubular chamber 56 may be elongated along the second bolster 44 when the airbag 20 is in the inflated position. In other words, the first tubular chamber 54 and the second tubular chamber 56 may be spaced cross-seat with the occupant seating area 40 being between the first tubular chamber 54 and the second tubular chamber 56. The first tubular chamber 54 and the second tubular chamber 56 may be elongated on either side of the occupant seated in the seat 14. The main chamber 52 may extend from the first tubular chamber 54 to the second tubular chamber 56 when the airbag 20 is in the partially inflated position and the inflated position to surround the occupant seating area 40.

The inflator 48 is supported by the seatback 18 and is in fluid communication with the airbag 20. Specifically, the inflator 48 is in fluid communication with the main chamber 52, the first tubular chamber 54, and the second tubular chamber 56 of the airbag 20. The main chamber 52, the first tubular chamber 54, and the second tubular chamber 56 each define separate inflation chambers (not numbered) in communication with the inflator 48. Specifically, the main chamber 52, the first tubular chamber 54, and the second tubular chamber 56 may be fluidly isolated from each other. In other words, the inflation medium does not freely pass between the main chamber 52, the first tubular chamber 54, and the second tubular chamber 56, the inflation medium passes directly from the inflator 48 to the main chamber 52, the first tubular chamber 54, and the second tubular chamber 56. The inflator 48 expands the airbag 20 with inflation medium, such as a gas, to move the airbag 20 from the uninflated position to the inflated position. The inflator 48 may be supported by any suitable component. For example, the inflator 48 may be supported by the housing. The inflator 48 may be, for example, a pyrotechnic inflator that ignites a chemical reaction to generate the inflation medium, a stored gas inflator that releases e.g., by a pyrotechnic valve stored gas as the inflation medium, or a hybrid. The inflator 48 may be, for example, at least partially in the inflation chamber to deliver inflation medium directly to the inflation chamber or may be connected to the inflation chamber through fill tubes, diffusers, etc.

The airbag 20 may be fabric, e.g., a woven polymer. As an example, the airbag 20 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

With continued reference to FIGS. 2-6, the assembly 10 includes one or more pyrotechnic devices 24, 64 supported by the seat bottom 16. For example, as shown in the Figures, the assembly 10 includes a first pyrotechnic device 24 and a second pyrotechnic device 64. The first pyrotechnic device 24 and the second pyrotechnic device 64 is operatively coupled to the airbag 20. The pyrotechnic device 24 is activated to pull the airbag 20 downwardly toward the seat bottom 16. In other words, as the airbag 20 inflates toward the partially inflated position, the airbag 20 inflates upwardly and the pyrotechnic device 24 pulls the airbag 20 downwardly around the occupant seating area 40 when the airbag is in the inflated position, i.e., the occupant of the seat 14. A delay may occur between the airbag 20 inflating upwardly and the pyrotechnic device 24 The pyrotechnic devices 24, 64 moves the airbag 20 into position to surround the occupant to control the kinematics of the occupant in the event of certain vehicle impacts.

The first pyrotechnic device 24 and the second pyrotechnic device 64 are spaced cross-seat from each other. In other words, the first pyrotechnic device 24 and the second pyrotechnic device 64 may be supported by the seat bottom 16 on each side of the seat bottom 16. Specifically, the first pyrotechnic device 24 and the second pyrotechnic device 64 may be mounted to the seat bottom 16 on each side of the seat bottom 16. In other words, the occupant seating area 40 may be between the first pyrotechnic device 24 and the second pyrotechnic device 64. The pyrotechnic devices 24, 64 may be supported at a seat-rearward end of the seat bottom 16, i.e., below the seatback 18. The pyrotechnic devices 24, 64 may be supported adjacent the location where the seatback 18 may hinge relative to the seat bottom 16.

The assembly 10 includes one or more tethers 66, 68 extending from the pyrotechnic devices 24, 64 to the airbag 20. Specifically, the assembly 10 includes a first tether 66 extending from the first pyrotechnic device 24 to the airbag 20 and a second tether 68 extending from the second pyrotechnic device 64 to the airbag 20. The tethers 66, 68 may be attached at the bottom end 50 of the airbag 20. The tether may be attached to the airbag 20 in any suitable way, e.g., a stitch, sonic welding, etc.

The tethers 66, 68 are retractable by the pyrotechnic devices 24, 64. The tethers 66, 68 are retractable from an extended position and a retracted position. The tethers 66, 68 are in the extended position when the airbag 20 is in the partially inflated position and the tethers 66, 68 are in the retracted position when the airbag 20 is in the inflated position. In other words, when the pyrotechnic devices 24, 64 are activated, the tethers 66, 68 are retracted by the pyrotechnic devices 24, 64 to move the airbag 20 downwardly toward the seat bottom 16. As the tethers 66, 68 are retracted, the length of the tethers 66, 68 may shorten. In other words, the shortening of the tethers 66, 68 moves the airbag 20 downwardly toward the seat bottom 16. As the pyrotechnic devices 24, 64 retract the tethers 66, 68, the airbag 20 is pulled downwardly to surround the occupant seating area 40, i.e., the occupant of the seat 14.

The tethers 66, 68 may be of any suitable material. In some examples, the tethers 66, 68 may be of similar material to the airbag 20, e.g., a woven polymer. In other examples, the tethers 66, 68 may be of similar material to the seatbelt webbing 22, e.g., woven nylon as described further below.

The pyrotechnic devices 24, 64 include a pyrotechnic charge that activates in the event of certain vehicle impacts to move the airbag 20 downwardly toward the seat bottom 16. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

The pyrotechnic devices 24, 64 be any suitable type such as a rotary pyrotechnic device 24, in which the pyrotechnic charge rotates a shaft connected to the tether such that the tether wraps around the shaft; a piston linkage, in which the pyrotechnic charge for example, drives a piston attached to the tether; a ball-in-tube linkage, in which an pyrotechnic charge propels a ball or balls over a cogwheel connected to the tether; a mechanical linkage, in which a compressed spring attached to the tether is released; or any other suitable type.

Figure 4:
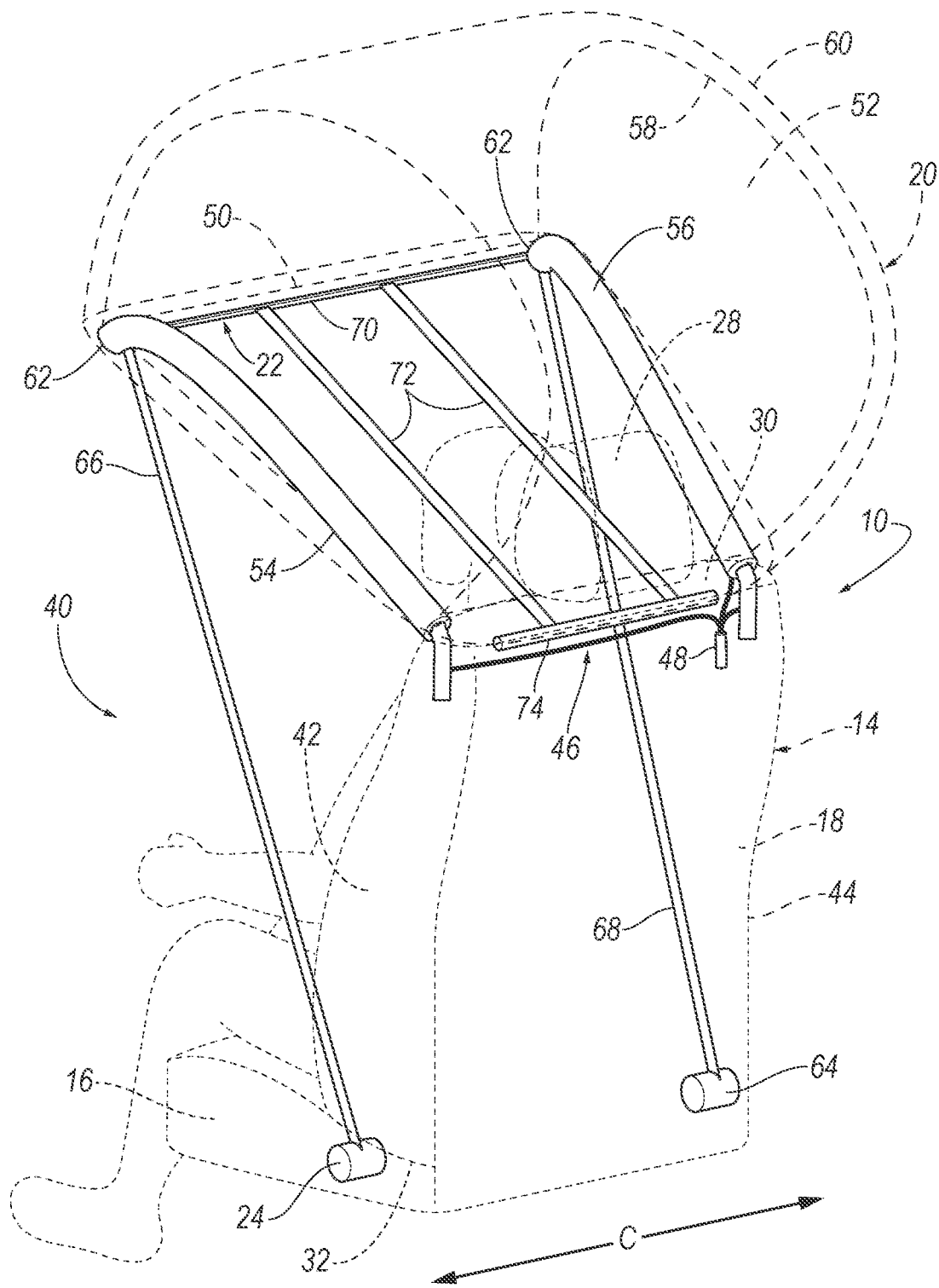
FIG. 4 is a rear perspective view of the seat with the airbag inflating to the inflated position and pair of tethers retractable by pyrotechnic devices.
Figure 5:
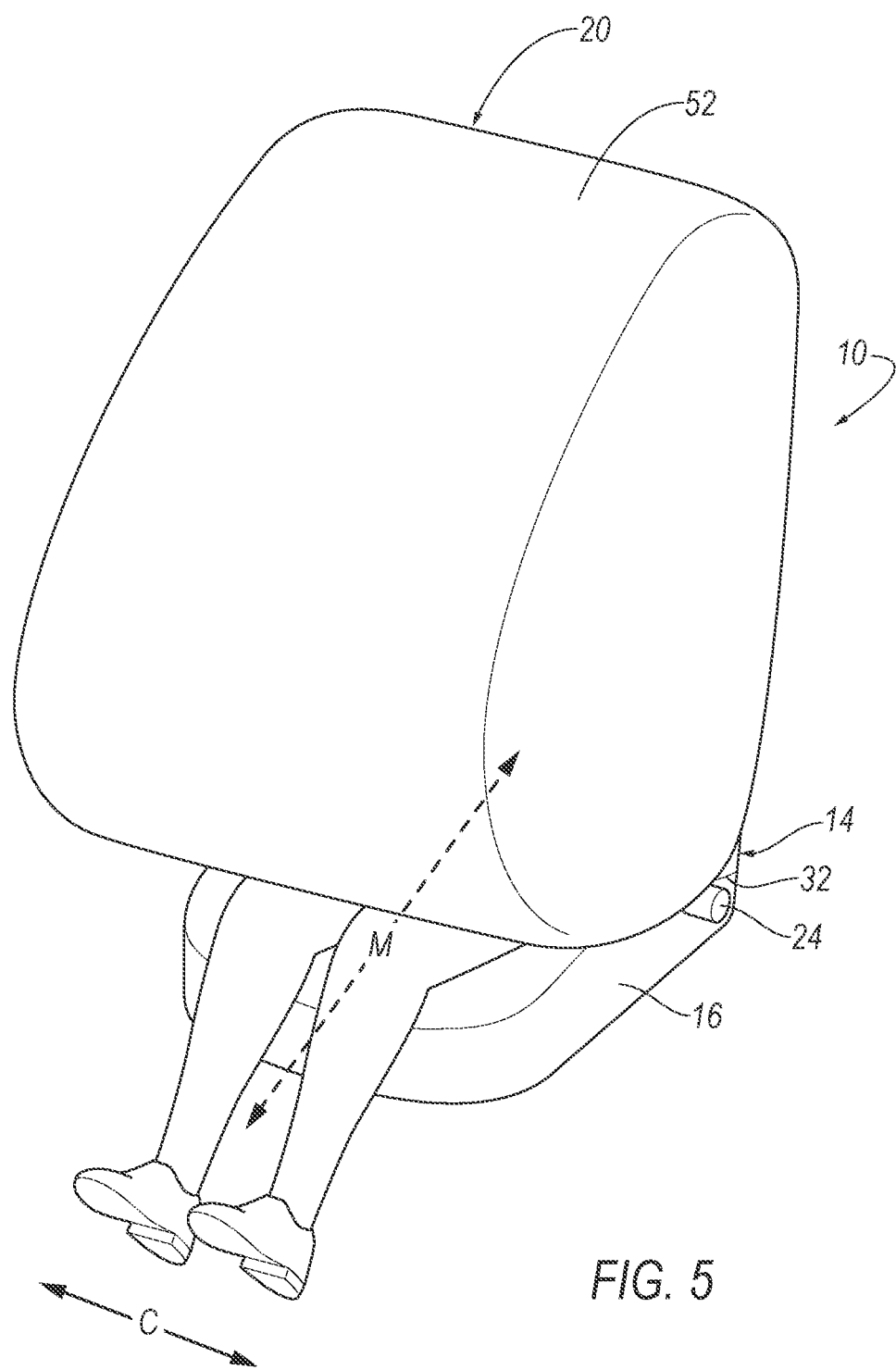
FIG. 5 is a forward perspective view of the seat with the airbag inflating to an inflated position and pair of tethers retracted by pyrotechnic devices.
Figure 6:
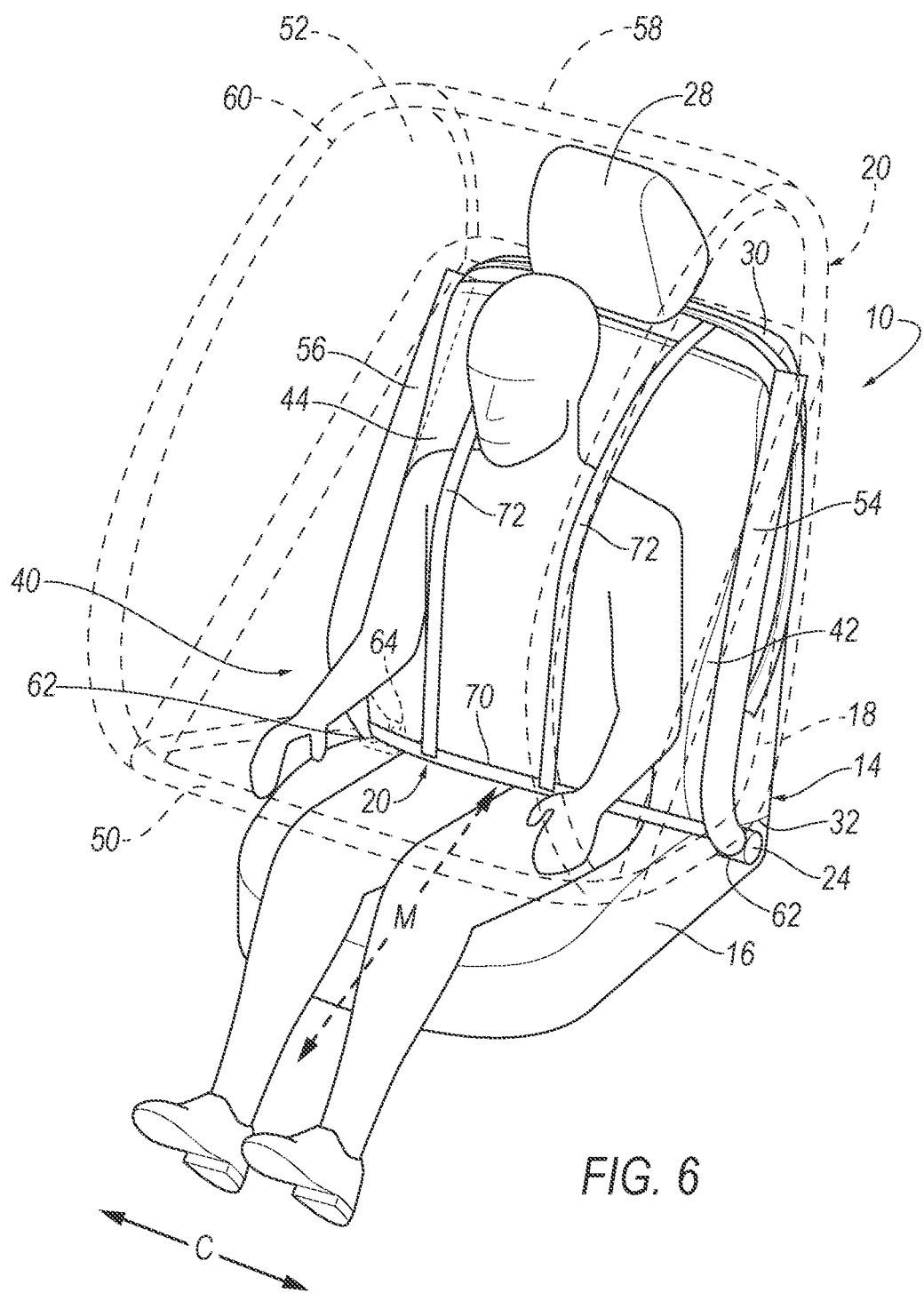
FIG. 6 is a forward perspective view of the seat with the airbag inflating to an inflated position and pair of tethers retractable by pyrotechnic devices and a seatbelt webbing over the occupant of the seat.

With reference to FIGS. 3, 4, and 6, the assembly 10 include the seatbelt webbing 22 connected to the seat 14 and the airbag 20. In the uninflated position, the seatbelt webbing 22 may be concealed under the covering of the seat 14 with the airbag 20. For example, the seatbelt webbing 22 may be folded under the covering when the seat 14 is in the uninflated position. In the partially inflated position and inflated position, the seatbelt webbing 22 extends from the seatback 18 to the airbag 20. Specifically, the seatbelt webbing 22 extends from the upper end 30 of the seatback 18 to the bottom end 50 of the airbag 20, e.g., the inner panel 58 of the airbag 20, when the airbag 20 is in the inflated position.

As the airbag 20 inflates upwardly toward the partially inflated position, the seatbelt webbing 22 is unfolded from the seatback 18 and extended between the airbag 20 and the seatback 18. As the airbag 20 is pulled downwardly by the pyrotechnic devices 24, 64, the seatbelt webbing 22 is pulled downwardly over the occupant seating area 40 of the seat 14 as the tethers 66, 68 are retracted by the pyrotechnic devices 24, 64. In other words, as the airbag 20 is pulled downwardly by the pyrotechnic devices 24, 64, the seatbelt webbing 22 is pulled downwardly over the occupant of the seat 14. The pyrotechnic device 24 is designed to pull the seatbelt webbing 22 across the occupant of the seat 14 when the airbag 20 reaches in the inflated position. The seatbelt webbing 22 may abut the occupant. For example, the seatbelt webbing 22 may abut the lap, chest, and/or shoulders of the occupant when the airbag 20 is inflated and the tethers 66, 68 are retracted. The seatbelt webbing 22 abutting the occupant allows the seatbelt webbing 22, in addition to the airbag 20, to control the kinematics of the occupant in the event of certain vehicle impacts. The seatbelt webbing 22 may be any suitable material. For example, the seatbelt webbing 22 may be fabric, e.g., woven nylon.

When the airbag 20 is in the inflated position and the tethers 66, 68 have been retracted by the pyrotechnic devices 24, 64, the seatbelt webbing 22 is between the airbag 20 and the seatback 18. Specifically, the seatbelt webbing 22 is surrounded by the airbag 20 when the airbag 20 is in the inflated position. The seatbelt webbing 22 is between the airbag 20 and the occupant seating area 40 when the airbag 20 is in the inflated position. The occupant seating area 40 is between the seatbelt webbing 22 and the seatback 18 when the airbag 20 is in the inflated position. In other words, as discussed above, the seatbelt webbing 22 extends across the occupant seating area 40 and over the occupant of the seat 14 when the airbag 20 is in the inflated position and the tethers 66, 68 are retracted. Specifically, the seatbelt webbing 22 is seat 14 forward of the occupant.

After the tethers 66, 68 have been retracted by the pyrotechnic devices 24, 64, the tethers 66, 68 are locked by the pyrotechnic devices 24, 64. In other words, the tethers 66, 68 are prevented from moving back to extended position by the pyrotechnic devices 24, 64 being locked. The locking of the tethers 66, 68 maintain the airbag 20 around the occupant seating area 40 to surround the occupant of the seat 14. In other words, the locking of the tethers 66, 68 maintain the bottom end 50 at the legs of the occupant of the seat 14. The pyrotechnic devices 24, 64 may lock after retracting the tethers 66, 68 in any suitable fashion, including, for example, using currently known technology for locking pyrotechnic devices.

The seatbelt webbing 22 may include a plurality of portions 70, 72 that extend across the occupant seating area 40 when the airbag 20 is in the inflated position and the tethers 66, 68 are retracted. For example, as shown in the Figures, the seatbelt webbing 22 includes a lap portion 70 elongated in a cross-seat direction C and a pair of shoulder portions 72 extending from the seatback 18 to the lap portion 70. The lap portion 70 is designed to extend across the occupant's lap and the shoulder portions 72 are designed to extend across shoulders of the occupant. The cross-seat direction C may extend generally perpendicular to the cross-seat midline M.

The lap portion 70 of the seatbelt webbing 22 extends from one side of the airbag 20 to the other side of the airbag 20. The lap portion 70 may extend from the first tubular chamber 54 to the second tubular chamber 56 when the airbag 20 is in the inflated position. Specifically, the lap portion 70 is elongated from the distal end 62 of the first tubular chamber 54 to the distal end 62 of the second tubular end in the cross-seat direction C at the bottom end 50 of the airbag 20. As discussed above, the lap portion 70 is designed to extend across the occupant's lap. When the airbag 20 is in the inflated position and as the tethers 66, 68 are retraced, the lap portion 70 may be pulled downwardly toward the lap of the occupant to abut the lap of the occupant.

The shoulder portions 72, two of which are shown in the example in the Figures, extend from the seatback 18 to the lap portion 70. Specifically, the lap portions 70 extend from the upper portion of the seatback 18 to the lap portion 70 of the seatbelt webbing 22. The shoulder portions 72 may be connected to the lap portion 70. Specifically, the shoulder portions 72 may be connected by stitches or in any other suitable way. The shoulder portions 72 are spaced from each other in the cross-seat direction C. As shown in the Figures, the head restraint 28 of the seat 14 is between the shoulder portions 72. Accordingly, a head of the occupant will be between the shoulder portions 72 when the airbag 20 is in the inflated position and the tethers 66, 68 are retracted.

The assembly 10 may include a retractor 74 coupled to the seatbelt webbing 22. The retractor 74 may be supported by the seatback 18. Specifically, the retractor 74 may be supported at and fixed to the upper end 30 of the seatback 18. The retractor 74 may be coupled to the shoulder portions 72 of the seatbelt webbing 22. As the pyrotechnic devices 24, 64 retract the tethers 66, 68, the retractor 74 may retract the shoulder portions 72 to tighten the shoulder portions 72 over the shoulders of the occupant.

As the airbag 20 reaches the inflated position, the seatbelt webbing 22 is retracted into the retractor 74 and the retractor 74 prevents payout of the seatbelt webbing 22. Specifically, after the airbag 20 reaches the inflated position, the retractor 74 prevents extension of the seatbelt webbing 22 from the retractor 74 to limit the forward movement of the occupant when the airbag 20 is in the inflated position. The retractor 74 may include a housing (not numbered), a spool (not numbered) that is rotatable relative to the housing, and a spring between the spool and the housing to rotationally bias the spool to retract the seatbelt webbing 22. The spring may be, for example, a spiral spring that is loaded to bias the spool to rotate and retract the seatbelt webbing 22 prior to inflation of the airbag 20 and after inflation of the airbag 20. The retractor 74 may include a locking device (not shown) engageable with the spool to restrict payout of the seatbelt webbing 22 from the retractor 74. The locking device may be any suitable locking device known in the art, e.g., a ratchet. The retractor 74 locks the seatbelt webbing 22 to control the kinematics of the occupant. Specifically, the spool is locked relative to the housing.

The seatbelt webbing 22 is unattached to the airbag 20 between the upper end 30 of the seatback 18 and the bottom end 50 the airbag 20. In other words, the seatbelt webbing 22 is only connected to the upper end 30 of the seatback 18 and the bottom end 50 of the airbag 20, e.g., the distal ends 62 of the tubular chambers 54, 56. As the airbag 20 is inflated and the tethers 66, 68 are retracted by the pyrotechnic devices 24, 64, the seatbelt webbing 22 is pulled over the occupant by the airbag 20 and the retractor 74.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
   a vehicle seat having a seat bottom and a seatback supported by the seat bottom;
   an airbag supported by the seatback, the airbag being inflatable to an inflated position;
   a seatbelt webbing extending from the seatback to the airbag, the seatbelt webbing being between the airbag and the seatback in the inflated position;
   a pyrotechnic device supported by and fixed in position relative to the seat bottom and operatively coupled to the airbag to pull the airbag downwardly toward the seat bottom; and
   a retractor supported by and fixed in position relative to the seatback, the seatbelt webbing being retractably coupled to the retractor so that the webbing is retractable into the retractor and the retractor prevents extension of the seatbelt webbing from the retractor.

2. The assembly of claim 1, wherein the airbag includes a main chamber, a first tubular chamber, and a second tubular chamber, the main chamber being between the first tubular chamber and the second tubular chamber.

3. The assembly of claim 2, wherein the seatback defines a first bolster and a second bolster spaced cross-seat from the first bolster, the first tubular chamber extending along the first bolster in the inflated position and the second tubular chamber extending along the second bolster.

4. The assembly of claim 2, further comprising an inflator supported by the seatback, the inflator being in fluid communication with the main chamber, the first tubular chamber, and the second tubular chamber.

5. The assembly of claim 2, wherein the vehicle seat defines an occupant seating area, the occupant seating area being between the first tubular chamber and the second tubular chamber when the airbag is in the inflated position.

6. The assembly of claim 1, wherein the seatback defines a first bolster and a second bolster spaced cross-seat from the first bolster, the airbag extends from the first bolster to the second bolster in the inflated position.

7. The assembly of claim 1, wherein the seatbelt webbing includes a lap portion elongated in a cross-seat direction and a pair of shoulder portions extending from the seatback to the lap portion, the shoulder portions being spaced cross-seat from each other.

8. The assembly of claim 7, wherein the vehicle seat includes a head restraint supported by and extending upwardly from the seatback, the head restraint being between the shoulder portions.

9. The assembly of claim 7, wherein:
   the airbag includes a first tubular chamber and a second tubular chamber spaced cross-seat from the first tubular portion; and
   the lap portion extending from the first tubular chamber to the second tubular chamber.

10. The assembly of claim 7, wherein, when the airbag is in the inflated position, the lap portion is designed to extend across a lap of an occupant of the vehicle seat and the shoulder portions are designed to extend across shoulders of the occupant.

11. The assembly of claim 1, further comprising a tether extending from the pyrotechnic device to the airbag, the tether being retractable by the pyrotechnic device.

12. The assembly of claim 1, further comprising a second pyrotechnic device supported by the seat bottom and spaced cross-seat from the pyrotechnic device.

13. The assembly of claim 12, further comprising a first tether extending from the pyrotechnic device to the airbag and a second tether extending from the second pyrotechnic device to the airbag, the first tether and the second tether being retractable by the pyrotechnic devices.

14. The assembly of claim 1, wherein:
   the vehicle seat defines an occupant seating area, the occupant seating area being between the airbag and the seatback when the airbag is in the inflated position; and
   the occupant seating area is between the seatbelt webbing and the seatback when the airbag is in the inflated position.

15. The assembly of claim 14, wherein the seatbelt webbing is between the airbag and the occupant seating area when the airbag is in the inflated position.

16. The assembly of claim 1, wherein the pyrotechnic device is designed to pull the seatbelt webbing across an occupant of the vehicle seat when the airbag is in the inflated position.

17. The assembly of claim 1, wherein the seatbelt webbing extends from an upper end of the seatback to a bottom end of the airbag when the airbag is in the inflated position.

18. The assembly of claim 17, wherein the seatbelt webbing is unattached to the airbag between the upper end of the seatback and the bottom end the airbag.

19. An assembly comprising:
   a vehicle seat having a seat bottom and a seatback supported by the seat bottom;
   an airbag supported by the seatback, the airbag being inflatable to an inflated position;
   a seatbelt webbing extending from the seatback to the airbag, the seatbelt webbing being between the airbag and the seatback in the inflated position; and
   a pyrotechnic device supported by the seat bottom and operatively coupled to the airbag;
   the seatbelt webbing extending from an upper end of the seatback to a bottom end of the airbag when the airbag is in the inflated position; and
   the seatbelt webbing being unattached to the airbag between the upper end of the seatback and the bottom end the airbag.

20. An assembly comprising:
   a vehicle seat having a seat bottom and a seatback supported by the seat bottom;
   an airbag supported by the seatback, the airbag being inflatable to an inflated position;
   a seatbelt webbing extending from the seatback to the airbag, the seatbelt webbing being between the airbag and the seatback in the inflated position; and
   a pyrotechnic device supported by the seat bottom and operatively coupled to the airbag;
   the seatbelt webbing including a lap portion elongated in a cross-seat direction and a pair of shoulder portions extending from the seatback to the lap portion, the shoulder portions being spaced cross-seat from each other.

* * * * *